United States Patent [19]
Robinson et al.

[11] Patent Number: 5,973,817
[45] Date of Patent: Oct. 26, 1999

[54] POLARIZATION INDEPENDENT OPTICAL PHASE MODULATOR

[75] Inventors: Michael Geraint Robinson, Stadhampton; Nicholas Mayhew, Oxford; Duncan James Anderson, Abingdon; Craig Tombling, Stadhampton; Michael John Towler, Botley; Harry Garth Walton, Cowley; Martin David Tillin, Abingdon, all of United Kingdom

[73] Assignee: Sharp Kabushiki Kaisha, Osaka, Japan

[21] Appl. No.: 09/074,858

[22] Filed: May 8, 1998

[30] Foreign Application Priority Data

May 9, 1997 [GB] United Kingdom ............... 9709467

[51] Int. Cl.$^6$ .......................... G02F 1/13; G02F 1/1343
[52] U.S. Cl. .................. 359/247; 359/251; 359/253; 359/254; 359/279
[58] Field of Search .......................... 359/318, 247, 359/251, 253, 254, 263, 279, 245, 572; 349/96, 99, 100

[56] References Cited

U.S. PATENT DOCUMENTS

| 3,912,369 | 10/1975 | Kashnow | 350/160 |
| 4,266,859 | 5/1981 | Togashi | 349/112 |
| 5,600,485 | 2/1997 | Iwaki et al. | 359/561 |
| 5,742,368 | 4/1998 | Chen | 349/117 |

FOREIGN PATENT DOCUMENTS

| 0492637 | 7/1992 | European Pat. Off. . | |
| 0670510 | 9/1995 | European Pat. Off. . | |
| 0811872 | 12/1997 | European Pat. Off. . | |
| 2313920 | 12/1997 | United Kingdom | G02F 1/1335 |
| WO9712275 | 3/1997 | WIPO | G02F 1/1333 |

OTHER PUBLICATIONS

Search Report for United Kingdom Patent Application 9709467.6 dated Aug. 8, 1997.
Eschler et al., "Liquid Crystal Light Valves For Schlieren Optical Projection", Displays, vol. 16, No. 1 (1995), pp. 35–38.
O'Callaghan et al., "Diffractive Ferroelectric Liquid–Crystal Shutters For Unpolarized Light", Optics letters, vol. 16, No. 10 (May 15, 1991), pp. 770–772.
Neil et al., "Improved Transmission In A Two–Level, Phase–Only Spatial Light Modulator", Electronics Letters, vol. 30, No. 5 (Mar. 3, 1995), pp. 445–446.
Fritsch, "Schieren Optical System Using Liquid Crystal Phase Gratings For Large Screen Projection", Displays, vol. 13, No. 1 (1992), pp. 45–60.
Pancharatnam, "Achromatic Combinations Of Birefringent Plates", Proc. Ind. Acad. Sci., vol. 41A (1955), pp. 130–137.

*Primary Examiner*—Georgia Epps
*Assistant Examiner*—Margaret Burke

[57] ABSTRACT

A polarization independent optical phase modulator comprises first and second substrates. A reflector is disposed between the first and second substrates and a quarterwave plate is disposed between the reflector and the first substrate. A polarization dependent electrooptic layer is disposed between the quarterwave plate and the first substrate. The quarterwave plate has an optic axis which is aligned at 45 degrees to the polarization whose phase is modulated by the electrooptic layer.

19 Claims, 11 Drawing Sheets

POLARIZATION INDEPENDENT OPTICAL PHASE MODULATOR

BACKGROUND OF THE INVENTION

1. Field of the Invention

The present invention relates to a polarisation independent optical phase modulator. Such a modulator may be used to provide adaptive phase modulation to allow active manipulation of light, for instance for applications such as interferometry, deflection such as beam steering, imaging such as forming a Fresnel lens, and analogue modulation of diffracted light, for instance to provide a diffraction-based projection display.

2. Description of the Related Art

Eschler et al, "Liquid Crystal Light Valves for Schlieren Optical Projection", Displays, Volume 16, page 35, 1995 discloses a polarisation independent optical phase modulator comprising an electrooptic modulator, a retarder or static waveplate, and a mirror. The use of such a modulator in a diffraction-based projection system is also disclosed. The electrooptic modulator comprises a nematic liquid crystal device acting as a phase modulator. The nematic liquid crystal is untwisted and has antiparallel alignment so that, when an electric field is applied across the liquid crystal layer, the molecules tilt in a plane perpendicular to the layer so as to vary the retardation of light passing through the layer.

The waveplate is a static quarterwave plate whose optic axis is aligned at 45 degrees to the alignment direction of the nematic liquid crystal. The quarterwave plate is disposed between the electrooptic modulator and the mirror.

Operation of the phase modulator is illustrated in FIGS. 1 and 2 of the accompanying drawings. The reflective light path has been shown "unfolded" about fold plane FP so as to illustrate the operation more clearly. An arrow 1 illustrates the direction of light propagation through the device. A single arbitrary polarisation state of an unpolarised light beam is represented by orthogonally polarised components 2 and 3 having a phase difference φ between them. The light passes through the electrooptic modulator shown at 4 and the vertically polarised component 2 is delayed by $2\pi\Delta nd/\lambda$ relative to the horizontally polarised component, where $\Delta n$ is the birefringence of the electrooptic material of the modulator 4, d is the thickness of the modulator 4, and $\lambda$ is the wavelength of the light.

The mirror and quarterwave plate act as a static halfwave plate 5 whose optic axis is aligned at 45 degrees to the alignment direction of the modulator 4. The polarisations of the components 2 and 3 are therefore "reflected" about the optic axis as a result of passage through the halfwave plate formed by the quarterwave plate and the reflector. The light then passes again through the electrooptic modulator shown at 6, where the vertically polarised component 3 has its phase delayed by $2\pi\Delta nd/\lambda$. Thus, the components 2 and 3 both experience the same phase delay and remain orthogonal, but are reflected about the axis of the waveplate. Thus, although the electrooptic modulator provides polarisation dependent phase modulation, the change in polarisation produced by the halfwave plate 5 causes both polarisation components to experience the same phase modulation. The device therefore acts as a polarisation independent optical phase modulator. In particular, unpolarised incident light can always be resolved into a linear sum of polarisation states, each described by two orthogonally polarised beams. As described above, the device phase modulates any arbitrary polarisation state independently of what that state is so that the device modulates all states by the same amount. Therefore it will operate on unpolarised light.

In this known phase modulator, the electrooptic modulator, the quarterwave plate, and the reflector are embodied as separate optical elements. The device is arranged as a plurality of individually controllable picture elements (pixels) so as to provide spatial phase modulation, for instance resulting in a diffractive optical device whose diffraction properties are controllable. However, because of the effects of parallax between the separate optical elements, relatively large pixels are required in order to permit a usable range of incident angles. This problem of the known device is illustrated in FIG. 2 of the accompanying drawings. Where the phase modulator is used with an optical system 7, for instance forming part of a projection display, the orthogonal polarisation components are imaged into different planes. The polarisation component 2 is optically modulated by the electrooptic modulator at the position 4 whereas the component 3 is modulated at the position 6. The images of the two orthogonal polarisations are therefore formed in the distinct image planes shown at 8 and 9.

U.S. Pat. No. 3,912,369 discloses a reflective liquid crystal display having a liquid crystal cell, a quarterwave plate, and a reflector. The liquid crystal cell, the wave plate and the reflector are provided as separate elements, with the wave plate and reflector being disposed outside the liquid crystal cell.

A spatial light modulator using ferroelectric liquid crystal technology is disclosed in a paper entitled "Diffractive Ferroelectric Liquid Crystal Shutters for Unpolarised Light" by M. J. O'Callaghan and M. A. Handschy, Optics Letters, Volume 16 No. 10, May 1995, pages 770 to 772. The spatial light modulator disclosed in this paper is switchable between a first state in which it transmits incident light and a second state in which it acts as a phase diffraction grating.

Another spatial light modulator is disclosed in a paper entitled "Improved Transmission in a Two-Level, Phase Only, Spatial Light Modulator" by M. A. A. Neal and E. G. S. Page, Electron. Lett. 30 (5) pages 465–466 1994. This paper discloses a spatial light modulator which is switchable between a transmissive mode and a diffractive mode in which alternate strips of the modulator rotate unpolarised light by plus and minus 45 degrees and an associated halfwave retarder further rotates all the polarisation components of the light so as to provide phase-only modulation.

FIGS. 3 and 4 of the accompanying drawings show a reflection-mode diffractive spatial light modulator (SLM) of the type disclosed in GB 9611993.8 (publication No. 2 313 920). The SLM comprises a rectangular array of rectangular or substantially rectangular picture elements, only one of which is shown in FIGS. 3 and 4. The SLM comprises upper and lower glass substrates 11 and 12. The upper substrate 11 is coated with a transparent conducting layer of indium tin oxide (ITO) which is etched to form elongate interdigitated electrodes 13. The electrodes 13 are covered with an alignment layer 14 for a ferroelectric liquid crystal material.

A combined mirror and electrode 15 is formed on the glass substrate 12 and a static quarterwave plate 16 is formed on the silver mirror and electrode 15. The thickness of the plate 16 is controlled so that it acts as a quarterwave plate for a predetermined bandwidth in the visible spectrum, for instance centred about 633 nanometers.

A further alignment layer 17 is formed on the quarterwave plate 16. The substrates 11 and 12 are then spaced apart and stuck together so as to form a cell which is filled with the ferroelectric liquid crystal material to form a layer 18. The spacing provides a layer of ferroelectric liquid crystal material which provides a halfwave of retardation so that the liquid crystal layer acts as a halfwave retarder whose optic axis is switchable as described hereinafter.

For each pixel, the electrode 15 acts as a common electrode which is connectable to a reference voltage line, for instance supplying zero volts, for strobing data to be displayed at the pixel. Alternate ones of the elongate electrodes 13 are connected together to form first and second sets of parallel interdigitated electrodes which are connected to receive suitable data signals. Each pixel is switchable between a reflective state and a diffractive state as described hereinafter.

FIG. 5 of the accompanying drawings illustrates diagrammatically the operation of adjacent strips of the pixel shown in FIGS. 3 and 4 when the pixel is in the diffractive mode. The optical path through each pixel is folded by reflection at the mirror 15 but, for the sake of clarity, the path is shown unfolded in FIG. 5. The SLM acts on unpolarised light, which may be split into components of orthogonal polarisations for the sake of describing operation of the SLM. One of the component polarisations is shown at 20 in FIG. 5 and is at an angle $-\phi$ with respect to a predetermined direction 21.

Voltages which are symmetrical with respect to the reference voltage on the electrode 15 are applied to the first and second sets of alternating interdigitated electrodes 13a and 13b. Thus, ferroelectric liquid crystal material strips 18a and 18b disposed between the electrodes 13a and 13b and the electrode 15 have optic axes aligned at angles of $-\theta$ and $+\theta$, respectively, with respect to the direction 21, where $\theta$ is preferably approximately equal to 22.5 degrees.

Each strip 18a of ferroelectric liquid crystal material acts as a halfwave retarder so that the polarisation of the light component leaving the strip 18a is at an angle of $\phi-2\theta$ with respect to the direction 21. The light component then passes through the static quarterwave plate 16, is reflected by the mirror 15, and again passes through the static quarterwave plate 16, so that the combination of the quarterwave plate 16 and the mirror 15 acts as a halfwave retarder whose optic axis is parallel to the direction 21. The polarisation direction of light leaving the quarterwave plate 16 and travelling towards the ferroelectric liquid crystal material is "reflected" about the optic axis of the quarterwave plate and thus forms an angle $2\theta-\phi$ with respect to the direction 21. The light component then again passes through the strip 18a of ferroelectric liquid crystal material so that the output polarisation as shown at 24 is at an angle of $\phi-4\theta$ with respect to the direction 21. Thus, for each input component of arbitrary polarisation direction $-\phi$, the optical path through the SLM via each of the strips 18a of ferroelectric liquid crystal material is such that the polarisation direction is rotated by $-4\theta$. This optical path therefore rotates the polarisation of unpolarised light by $-4\theta$, which is substantially equal to $-90$ degrees.

Each strip 18b of ferroelectric liquid crystal material acts as a halfwave retarder and rotates the polarisation direction to $\phi+2\theta$. The fixed halfwave retarder formed by the combination of the quarterwave plate 16 and the mirror 15 rotates the direction of polarisation of the light component so that it makes an angle of $-2\theta-\phi$ with respect to the direction 21. The final passage through the strip 18b rotates the polarisation direction to $\phi+4\theta$ as shown at 25. Light of the orthogonal polarisation has its polarisation rotated in the same way. Thus, unpolarised light passing through the strips 18b has its polarisation rotated by $+4\theta$, which is substantially equal to $+90$ degrees.

Light reflected through each of the strips 18b is out of phase by 180 degrees with respect to light passing through each of the strips 18a when the electrodes 13b and 13a are connected to receive data signals of opposite polarity. In this state, the pixel acts as a phase-only diffraction grating and the pixel operates in the diffractive mode. Because of the bistable characteristics of ferroelectric liquid crystals, it is necessary only to supply the data signals in order to switch the strips 18a and 18b to the different modes illustrated in FIG. 5.

In order for the pixel to operate in the reflective mode, it is necessary to switch either or both sets of strips 18a and 18b so that their optic axes are parallel. Unpolarised light incident on the pixel is then substantially unaffected by the ferroelectric liquid crystal material and the quarterwave plate 16 and is subjected to specular reflection by the mirror and electrode 15. Each pixel is therefore switchable between a transmissive mode, in which light is specularly reflected or "diffracted" into the zeroth diffraction order, and a diffractive mode, in which light incident on the pixel is diffracted into the non-zero diffraction orders.

Such a diffractive SLM can be used with unpolarised light and provides increased optical modulation efficiency compared with SLMs which require polarised light.

FIG. 6 of the accompanying drawings illustrates a projection display using an SLM 30 of the type shown in FIGS. 3 and 4. The SLM 30 is illuminated by an unpolarised light source 31 via a mirror 32. A projection optical system 33 projects an image displayed by the SLM 30 onto a screen 34.

Light from the light source 31 is reflected by the mirror 32 so as to be incident normally on the SLM 30. Each pixel which is in the reflective mode reflects the incident light normally back to the mirror 32 so that the reflected light is not projected by the system 33. Thus, a "dark" pixel is imaged on the screen 34 by the system 33. Each pixel in the diffractive mode deflects the incident light into the non-zero diffraction orders, mainly into the positive and negative first orders as illustrated by light rays 35 and 36. The light from each such pixel is thus imaged to a "bright" pixel on the screen 34.

SUMMARY OF THE INVENTION

According to the invention, there is provided a polarisation independent optical phase modulator, comprising: two substrates; a reflector disposed between the two substrates; a waveplate disposed between a first of the substrates and the reflector for producing a retardation of $(n+1)\lambda/4$, where n is an integer greater than or equal to zero and $\lambda$ is a predetermined wavelength of visible light, and having an optic axis; and a polarisation dependent electrooptic layer disposed between the waveplate and the first substrate for modulating the phase of light having a polarisation substantially at 45 degrees to the optic axis of the waveplate.

A polarisation dependent electrooptic layer is a layer of electrooptic material which modulates the phase of light of a first linear polarisation as a function of an electric field applied to the layer but which does not affect the phase of light of a second linear polarisation orthogonal to the first polarisation. Thus, for light passing through such an electrooptic layer, the same orthogonal polarisation states remain unaltered in amplitude on exiting the layer for all values of applied electric field. In the case of planar aligned nematic liquid crystal layers, linear polarisation states aligned parallel and perpendicular to the alignment direction of the nematic liquid crystal are preserved. Only the linear polarisation state whose electric field is parallel to the long axis of the liquid crystal molecules is phase modulated as a function of the applied electric field.

When light is reflected by a phase modulator, according to the invention, one of two orthogonal polarisations is modulated by the electrooptic layer on its way to the reflector whereas the other is modulated after being reflected by the reflector. In particular, the waveplate and the reflector cooperate to form a waveplate which has a retardation of (n+1)$\lambda$/2 which reflects the polarisations about the optic axis of the waveplate. Thus, modulation of the two polarisation states occurs with an optical separation substantially equal to twice the thickness of the waveplate. The optical path difference can be made of the order of the wavelength of light. When such an optical phase modulator is used with an optical system as illustrated in FIG. 2, the separation between the image planes 8 and 9 is negligible for many applications of such a modulator, for instance in projection displays of the type shown in FIG. 6.

By disposing the optical elements between the two substrates, problems caused by parallax in the known device are greatly reduced. This is particularly advantageous where the optical phase modulator is used with unpolarised incoherent light sources, such as light emitting diodes and white light sources.

The arrangement disclosed in Eschler as described hereinbefore uses the same mode of operation as the present invention, but has a different structure. In particular, Eschler discloses the use of individual separate elements. The structure of the present invention allows the effects of parallax to be reduced as described hereinbefore. Sharp imaging is possible so that high resolution devices can be provided. Further, the structure of the present invention allows the second substrate to be embodied as an active substrate and a reflecting substrate. This gives the possibility of achieving high fill factors which improve the optical performance of the device. The structure disclosed by Eschler cannot be formed as a reflective addressed device using, for example, a silicon large scale integration (LSI) backplane.

GB 9611993.8 discloses an arrangement which has a similar structure to that of the present invention but which operates in a different mode as described hereinbefore. In particular, the liquid crystal of GB 9611993.8 switches in the plane of the layer whereas, when liquid crystal is used as the optical phase modulator of the present invention, it switches out of the plane. Also, the liquid crystal of GB 9611993.8 is not polarisation dependent as defined hereinbefore and as required by the present invention. Further, the waveplate orientation in GB 9611993.8 is not fixed relative to the alignment of the liquid crystal.

The construction allows the use of a reflective addressing substrate as one of the two substrates. Many applications of spatial phase modulation require patterned addressing electrodes, often with active elements, on one of the substrates. For large pixel aperture ratios and/or high resolution, such underlying structures may be buried under a near-continuous reflecting surface. This arrangement therefore permits such devices to be made while providing adequate phase modulation performance.

It is possible to provide continuous or analogue phase modulation as opposed to binary modes of operation in which, for instance, a diffraction grating can only be switched on or off. Thus, blazed gratings can be achieved for use where high fidelity single beam diffraction is required. Further, grey scale can be achieved within each pixel, for instance in display applications.

If the waveplate is sufficiently achromatic, the same device may be used for different wavelengths. The wavelength for which the device is to be used merely determines the range of electric fields which must be applied to the electrooptic layer to achieve the desired range of phase modulation.

Although any waveplate providing a retardation of an odd number of quarter waves may be used, it is preferred to use a quarterwave plate, for which n=0 giving a retardation of $\lambda$/4.

The waveplate may comprise a layer of aligned and cured reactive mesogen.

The electrooptic layer may comprise a layer of liquid crystal arranged to perform out-of-plane switching. The liquid crystal may be a nematic liquid crystal. In one embodiment, the liquid crystal has positive dielectric anisotropy and is disposed between alignment layers defining antiparallel alignment. In another embodiment, the liquid crystal has positive dielectric anisotropy and is disposed between alignment layers defining parallel alignment. In a further embodiment, the liquid crystal has positive dielectric anisotropy and is disposed between alignment layers defining hybrid alignment, in which one of the substrates has parallel alignment and the other substrate has homeotropic alignment. In a further embodiment, the liquid crystal has negative dielectric anisotropy and is disposed between alignment layers defining homeotropic alignment. In yet a further embodiment, the liquid crystal has negative dielectric anisotropy and is disposed between mutually parallel alignment layers.

The electrooptic layer may comprise a layer of lithium niobate.

The modulator may comprise a plurality of picture elements, each of which has at least one transparent first electrode disposed between the first substrate and the electrooptic layer and at least one second electrode disposed between the second substrate and the electrooptic layer. The second electrodes may comprise the reflector.

The first electrodes of all the picture elements may comprise a continuous layer of conductor.

The second substrate may carry an active addressing matrix connected to the second electrodes.

Each of the picture elements may have a plurality of first or second electrodes which are elongate and parallel.

BRIEF DESCRIPTION OF THE DRAWINGS

The invention will be further described, by way of example, with reference to the accompanying drawings, in which.

Like reference numerals refer to like parts throughout the drawings.

DETAILED DESCRIPTION OF THE INVENTION

Figure 7:
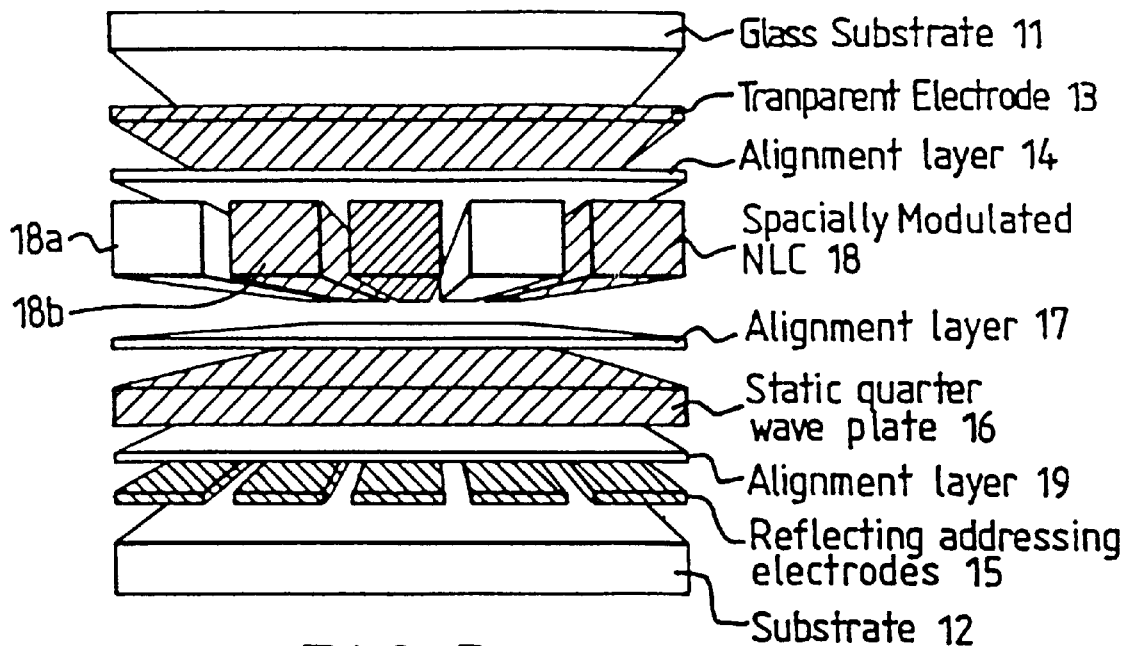
FIG. 7 is an exploded view of an optical phase modulator constituting an embodiment of the invention.
Figure 8:
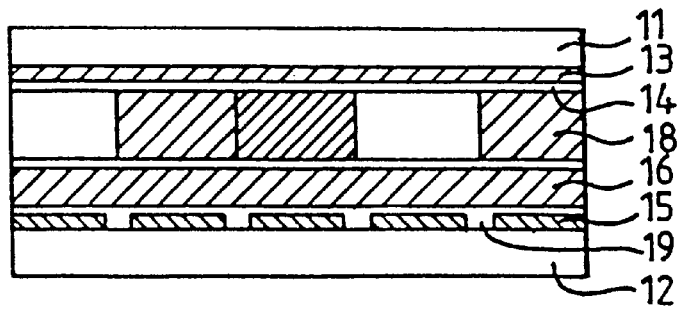
FIG. 8 is a cross-sectional diagram of the modulator of FIG. 7.

FIGS. 7 and 8 show a polarisation independent optical phase modulator comprising a rectangular array of rectangular or substantially rectangular picture elements, only one of which is shown in FIGS. 7 and 8. The modulator comprises upper and lower glass substrates 11 and 12. The upper substrate 11 is coated with a transparent conducting layer, for instance of indium tin oxide (ITO), which forms an electrode of the pixel. The electrode 13 is covered with an alignment layer 14 for nematic liquid crystal, for instance comprising a brushed polyimide layer.

The substrate 12 carries reflecting addressing electrodes 15 in the form of parallel elongate strips, for instance formed by depositing aluminium to a thickness of approximately 100 nanometers and etching to form the desired electrode pattern. An alignment layer 19, for instance comprising a layer of brushed polyimide, is formed on top of the reflecting electrodes 15. A static quarterwave plate 16 is formed on the alignment layer 19, for instance by spinning on a mixture of a reactive mesogen diacrylate, such as that known as RM258 available from Merck in Poole, UK, in a suitable solvent such a chlorobenzine with a photoinitiator. The alignment layer 19 aligns the reactive mesogen, which is then cured for approximately ten minutes under ultraviolet light in an atmosphere of nitrogen. The thickness of the plate 16 is controlled, for instance by varying the mixed ratios of the materials and the spin speed, so that it acts as a quarterwave plate for a predetermined bandwidth in the visible spectrum, for instance centred about 633 nanometers. The thickness d is given by the expression $d=\lambda/(4\Delta n)$, where $\lambda$ is the wavelength of the centre of the band and $\Delta n$ is the difference between the ordinary and extraordinary refractive indices of the material of the plate 16. The quarterwave plate 16 therefore typically has a thickness of the order of 800 nanometers. A further alignment layer 17 is formed on the quarterwave plate 16, for instance as described hereinbefore for the alignment layer 14. The alignment layers 14 and 17 are spun onto the underlying surface and comprise a polyimide material which is then rubbed at 45 degrees relative to the alignment direction of the plate 16. The rubbing directions of the alignment layers 14 and 17 are opposite so as to provide antiparallel alignment.

The substrates 11 and 12 are then spaced apart, for instance by spacer balls, and stuck together so as to form a cell which is filled with nematic liquid crystal material to form a layer 18. The nematic liquid crystal material may be that known as E7 available from Merck in Poole, UK. The thickness of the layer 18 is required to be such that the retardation provided by the layer can be controlled over a desired range for an acceptable range of voltages applied between the electrodes 13 and 15 and is typically between 1.5 and 2.5 micrometers.

In order to optimise the brightness of the display, the reflectivity of each interface should preferably be reduced, for instance by applying antireflection coatings to the substrate 11.

The use of antiparallel alignment with a nematic liquid crystal for the layer 18 of positive dielectric anisotropy results in the formation of a Freedericksz cell arrangement. The nematic liquid crystal forms, in the absence of an applied electric field, a nearly uniform parallel aligned layer whose optic axis, which is parallel to the long molecular axis, is at a small angle from the plane of the cell surface. The small angle is determined by the pretilt induced by the alignment layers 14 and 17.

Figure 9:
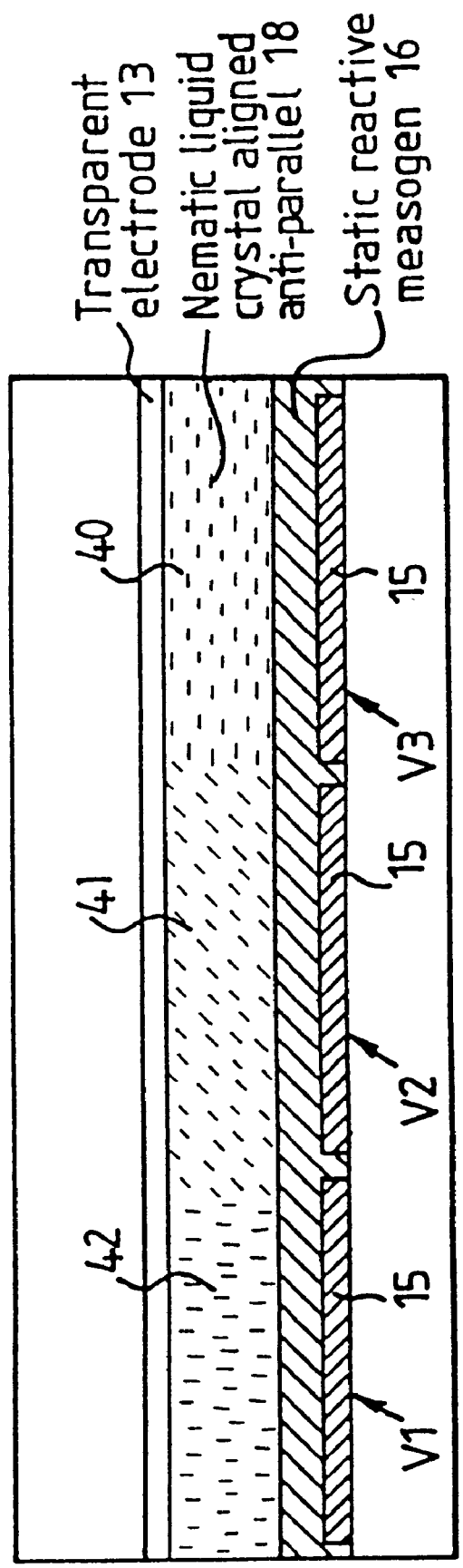
FIG. 9 is a simplified cross-sectional diagram illustrating operation of the modulator of FIG. 7.

FIG. 9 is a simplified cross-sectional view of the modulator illustrated in FIGS. 7 and 8 illustrating the effects of applying different magnitudes of electric field across the layer 18. The application of an electric field by supplying a suitable potential difference between the electrodes 13 and 15 forces the liquid crystal molecules to rotate out of the cell plane. This results in changes to the refractive index seen by light polarised along the alignment direction of the liquid crystal. Optical propagation through regions of the layer 18 with different applied fields and therefore different out-of-plane liquid crystal molecular orientations results in spatially varying analogue phase modulation and hence in diffraction.

Figure 1:
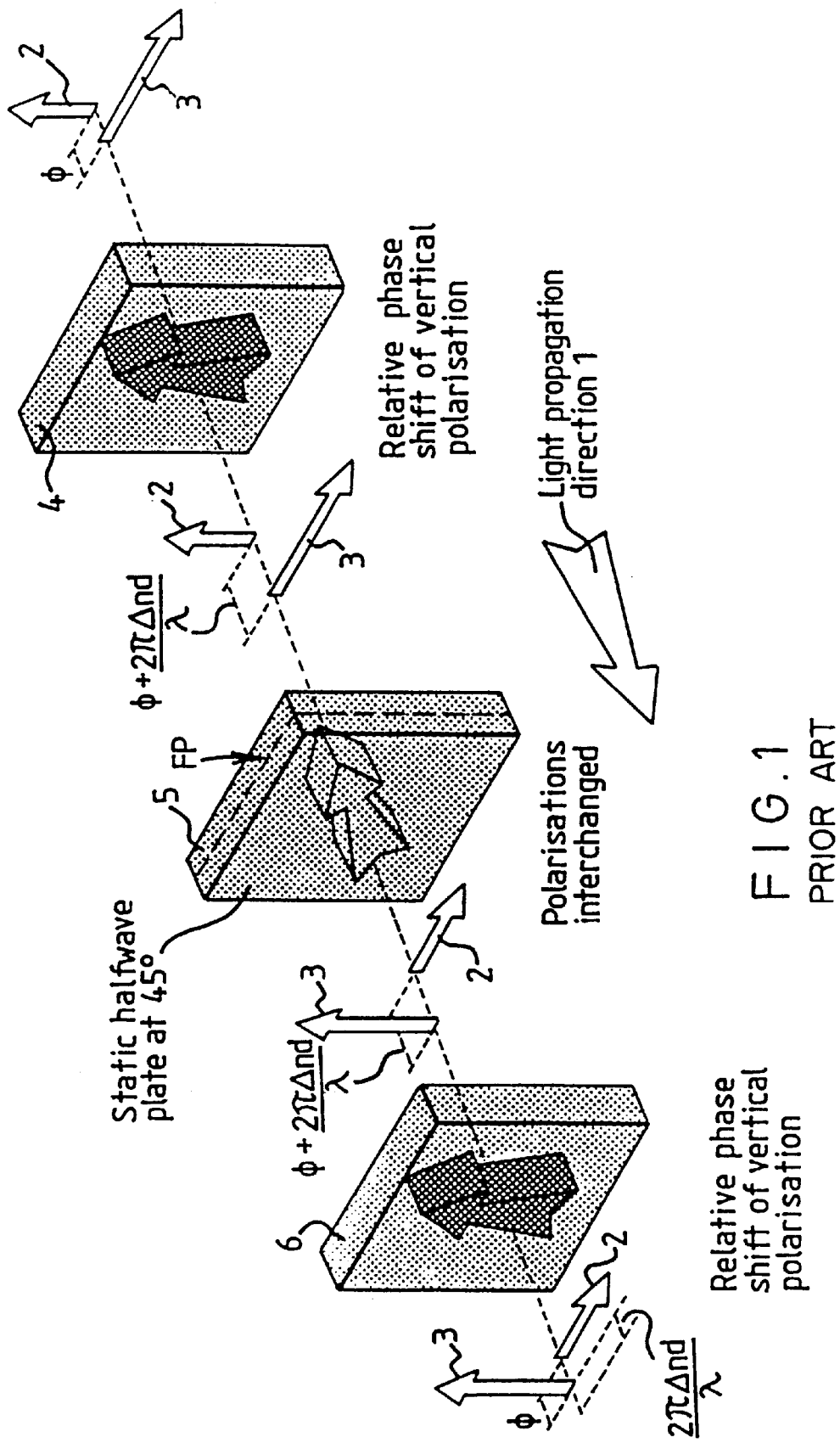
FIG. 1 is a diagram illustrating operation of a known type of phase modulator.
Figure 2:
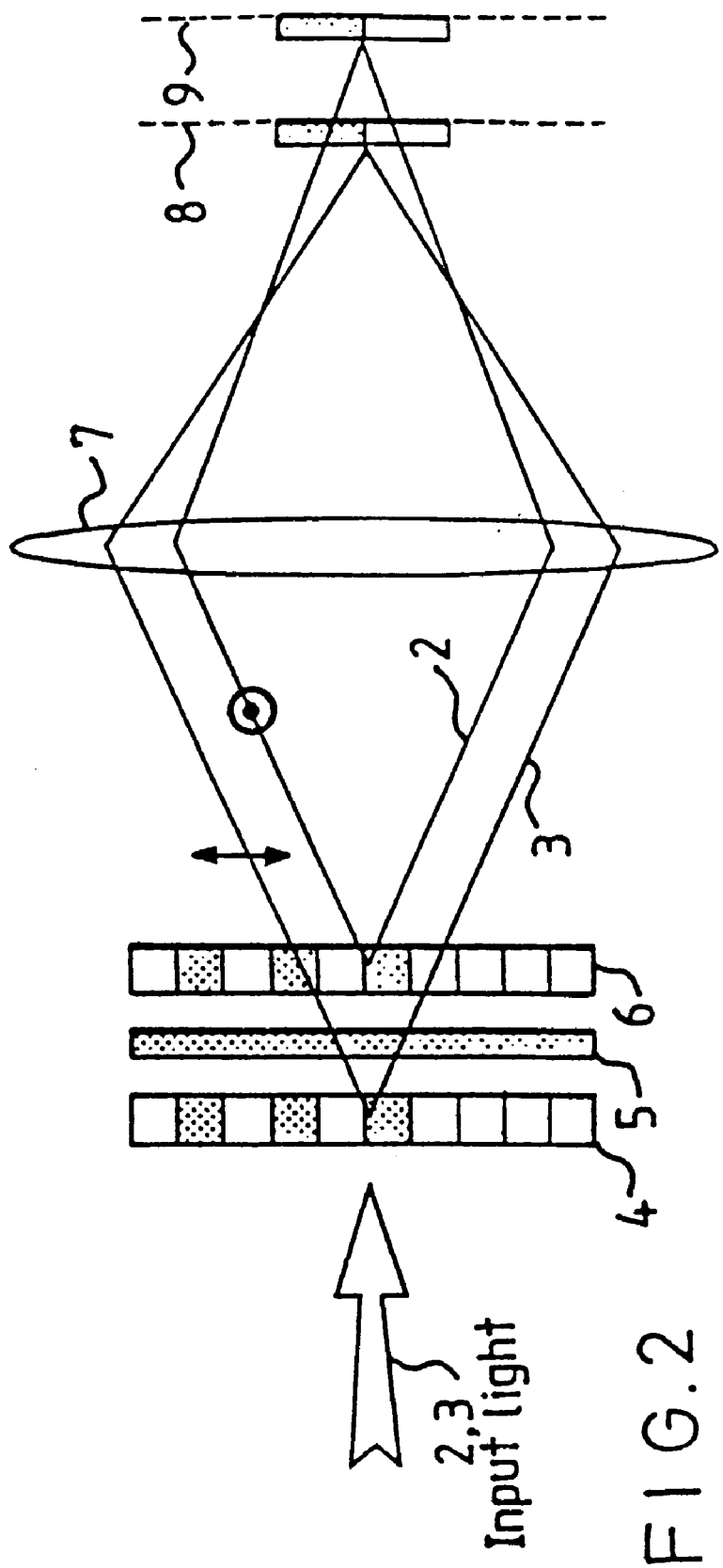
FIG. 2 is a diagram illustrating a disadvantage of the modulator of FIG. 1.
Figure 3:
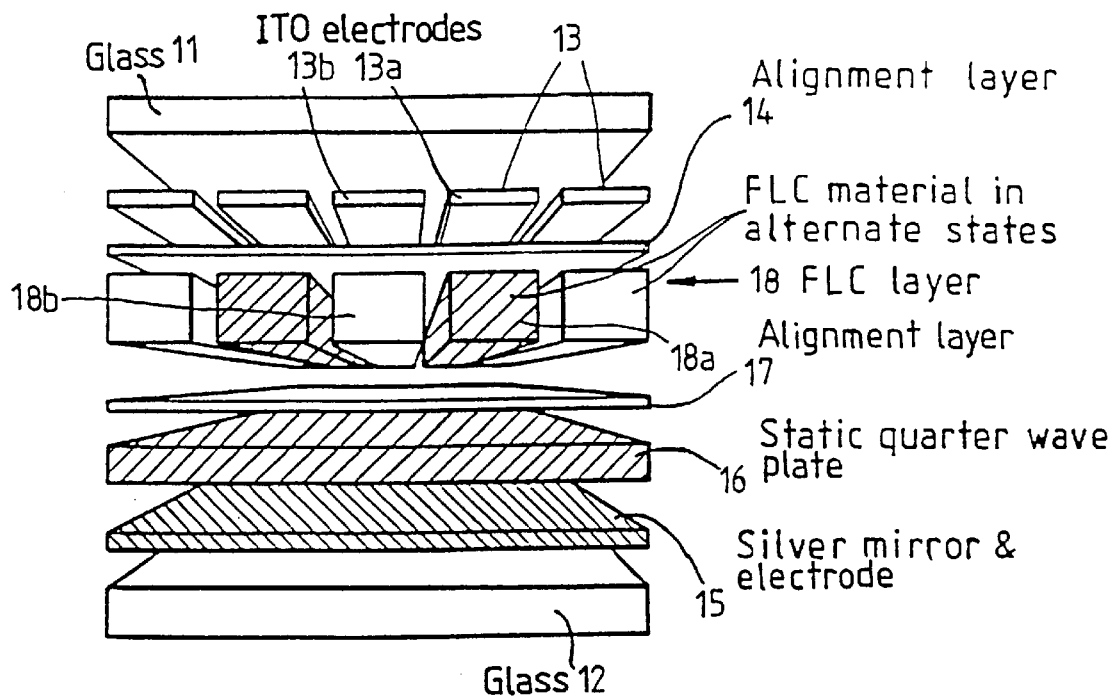
FIG. 3 is an exploded view of another known modulator.
Figure 4:
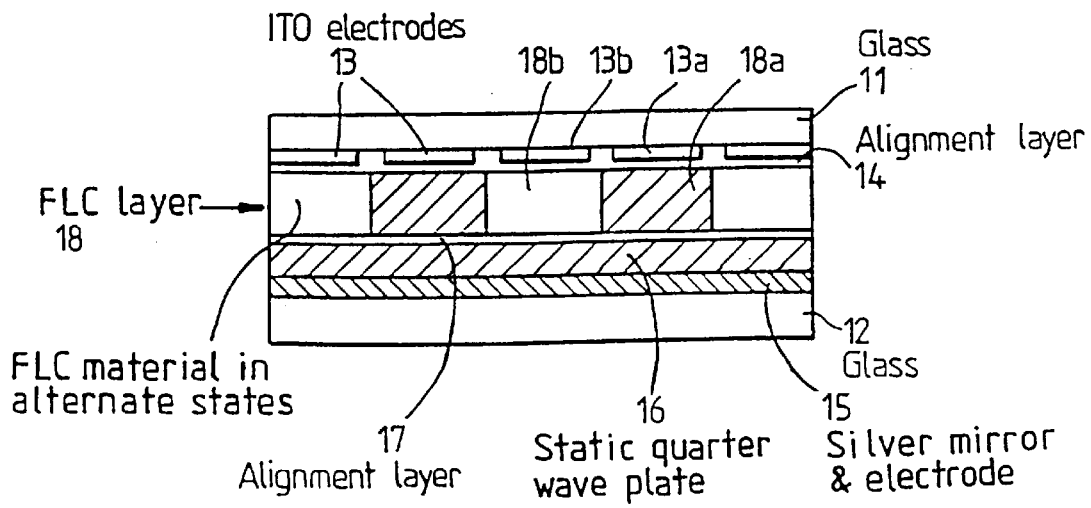
FIG. 4 is a cross-sectional diagram of the modulator of FIG. 3.
Figure 5:
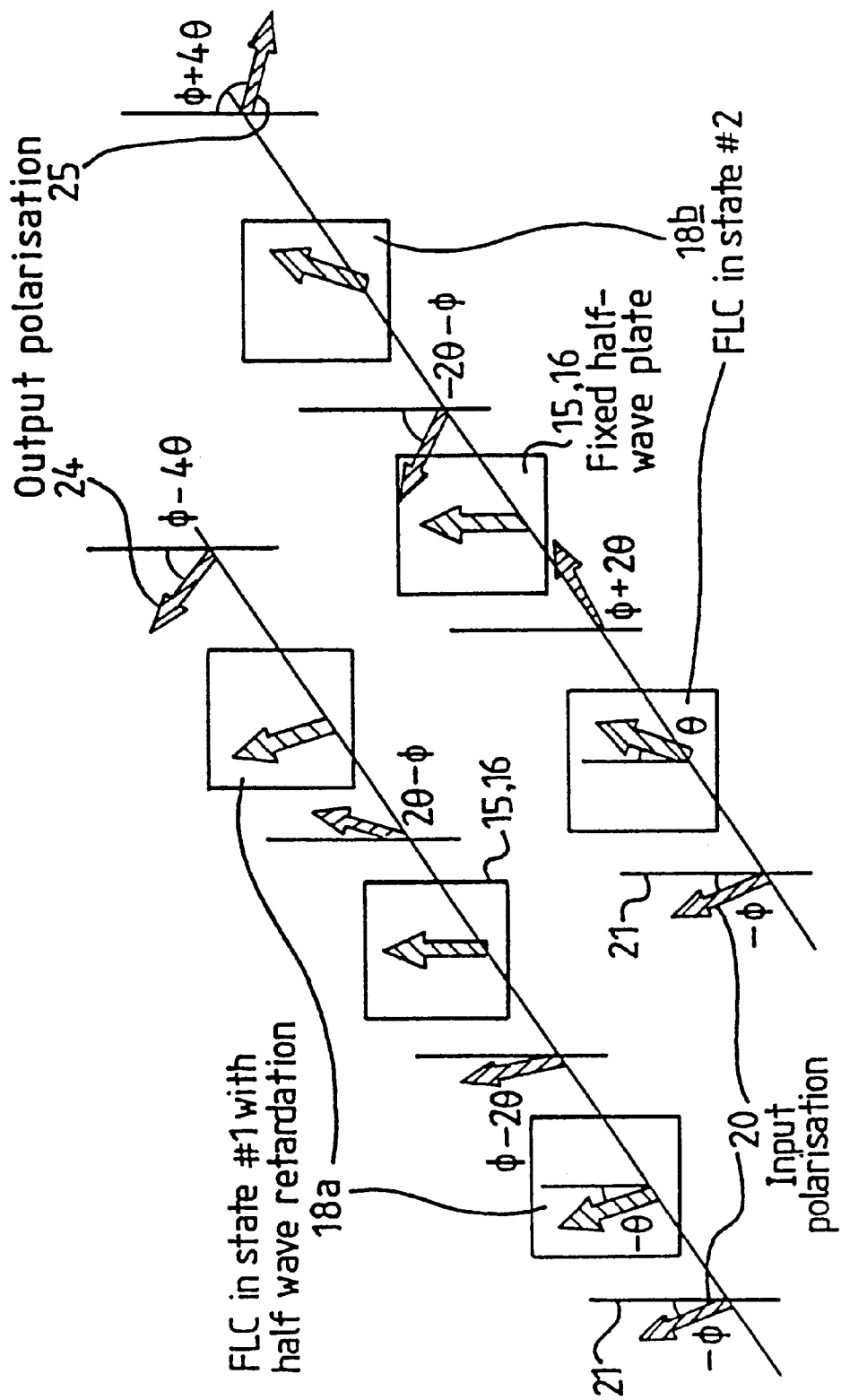
FIG. 5 is a diagram illustrating operation of the modulator of FIGS. 3 and 4.

As described hereinbefore, the quarterwave plate 16 and the reflector formed by the electrodes 15 act as a halfwave plate which exchanges the polarisation directions of orthogonally polarised components of the incident light. Thus, subsequent propagation through the layer 18 results in the same modulation being applied to the orthogonal component, as described hereinbefore with reference to FIG. 1. The modulator therefore acts as a polarisation independent optical phase modulator for all incident light.

FIG. 9 shows the effects of applying different voltages V1, V2 and V3 to the electrodes 15 relative to the electrode 13 on the long molecular axes of the nematic liquid crystal. V3 is a relatively low voltage and has little effect on the axes as illustrated in the region 40 of the layer 18. The voltage V2 is larger than V3 and results in tilting of the axes further away from the plane of the cell as illustrated in the region 41 of the layer 18. Application of a voltage V1 which is larger than V2 causes the molecular axes to be tilted such that they are substantially perpendicular to the cell surfaces as illustrated in the region 42 of the layer 18.

Figure 10:
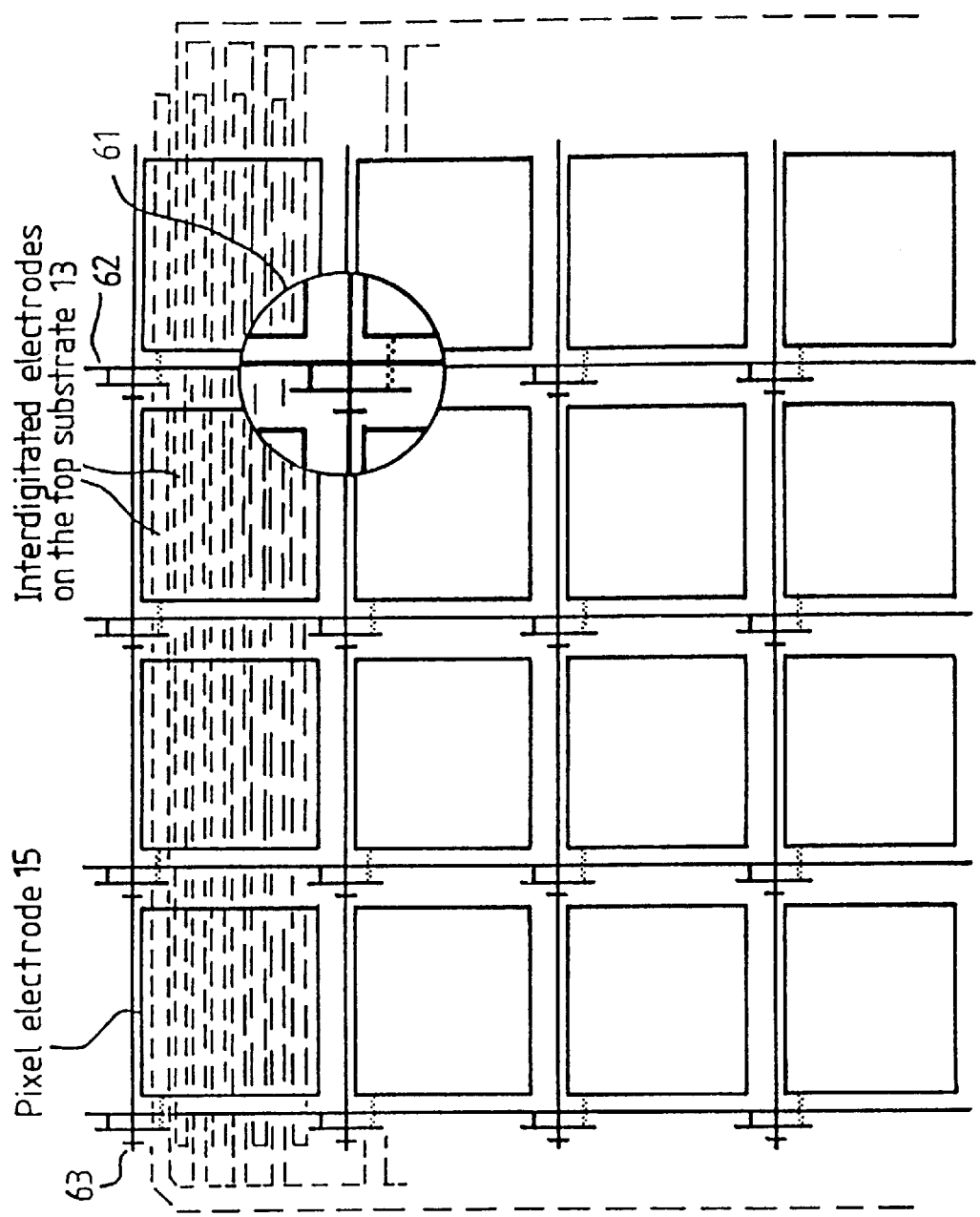
FIG. 10 is a diagrammatic plan view of an actively addressed optical phase modulator constituting a further embodiment of the invention.

FIG. 10 illustrates an active matrix addressing arrangement for an optical phase modulator comprising a rectangular array of pixels of the type shown in FIGS. 7 to 9. This arrangement may be formed as an active backplane constituting the substrate 12 but with the positions of the "plane" electrodes 13 and the interdigitated electrodes 15 exchanged compared with FIGS. 7 to 9.

The top substrate 11 carries two sets of interdigitated transparent electrodes 13, for instance made of indium tin oxide (ITO). The electrodes 13 are elongate or strip-shaped and are parallel with each other. The electrodes of each set are connected together and are interdigitated with the electrodes of the other set so that only two connections are required to the top substrate 11.

The bottom substrate 12 carries a rectangular array of reflecting pixel electrodes such as that shown at 15. Each pixel electrode 15 faces a plurality of the interdigitated transparent electrodes 13. An active matrix addressing scheme is provided for individually controlling the pixel electrodes 15 and a pixel element of the addressing arrangement is shown diagrammatically to an enlarged scale at 61. In the arrangement illustrated, each pixel electrode 15 is connected to the source of a thin film transistor (TFT) in the form of a pixel field effect transistor (FET). Each FET acts as a gate for the associated pixel.

The pixels are arranged as rows and columns with the drains of the transistors of each column being connected to a respective column or data electrode 62 connected to a data signal generator (not shown) and the gates of the transistors of each row being connected to a respective row or scan electrode 63 connected to a strobe signal generator (not shown). The pixels are thus enabled one row at a time so that image data for a complete row are written simultaneously. The addressing arrangement illustrated schematically in FIG. 10 is thus of the conventional dynamic random access memory (DRAM) type and may be fabricated on a silicon bottom substrate. The addressing arrangement may thus be substantially conventional and may be fabricated using substantially conventional techniques.

In an alternative arrangement, the interdigitated electrodes are disposed on the bottom substrate 12 and may be reflective.

Figure 6:
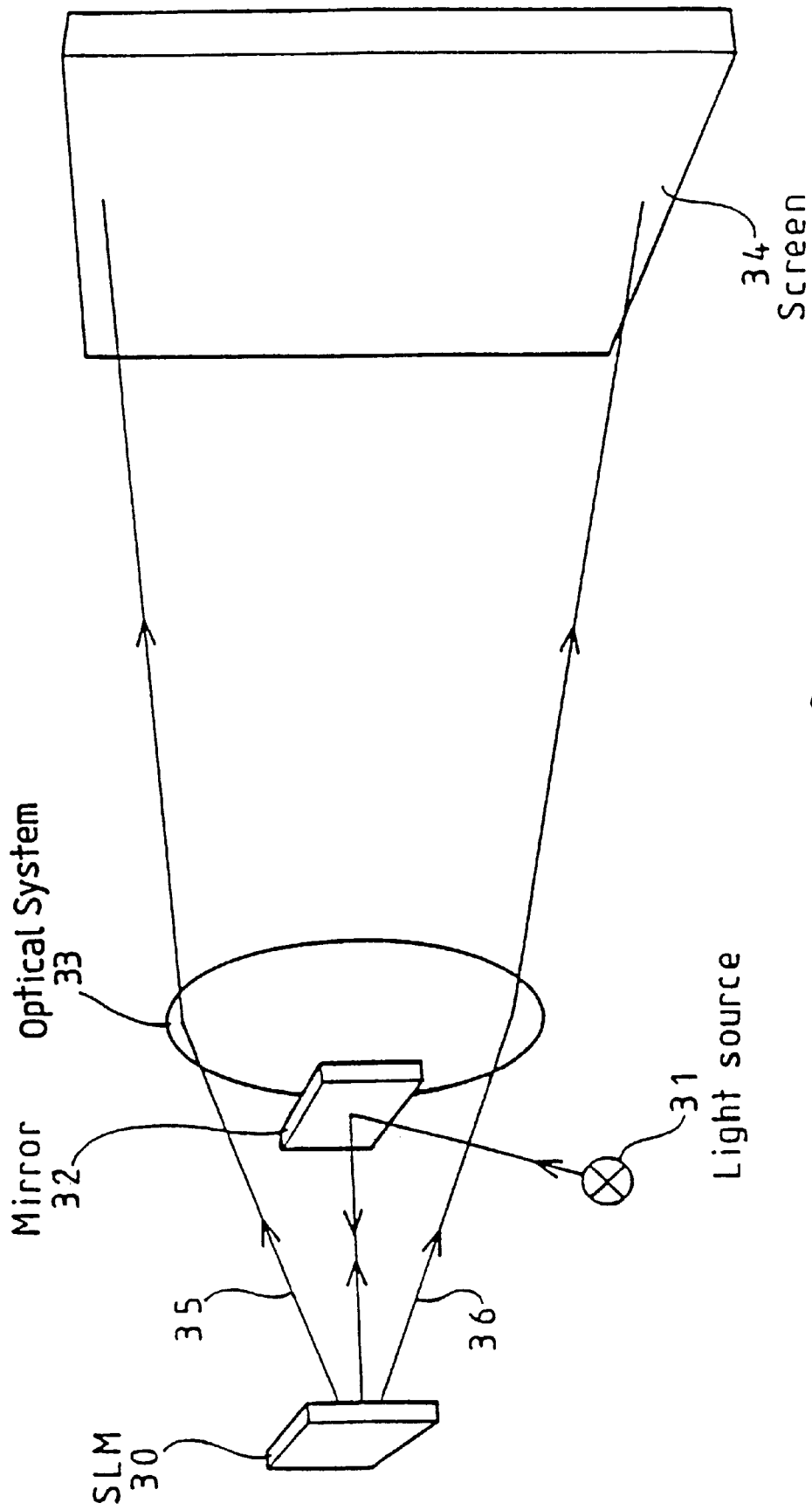
FIG. 6 is a schematic diagram of a projection display using phase-only diffraction grating modulators.

The actively addressed optical phase modulator shown in FIG. 10 is particularly suitable for use in projection display systems, for instance as illustrated in FIG. 6 or in a Schlieren optical projection system, for instance as disclosed in "Schlicren Optical System Using Liquid Crystal Phase Gratings for Large Screen Projection, M. W. Fritsch, Displays, Vol. 13, No. 1, pp 45–60, 1992. The voltages applied to the electrodes 13 and 15 are such as to cause each pixel to act as a phase-only diffraction grating. When the relative phase shift between light passing through adjacent regions of the liquid crystal layer 18, such as those indicated at 18a and 18b in FIG. 7, is 180 degrees, the diffraction produced by the pixel is a maximum whereas, when there is zero phase shift between adjacent regions 18a and 18b, the pixel effectively ceases to operate as a diffraction grating. The two sets of interdigitated electrodes 13 are arranged to receive different voltages Va and Vb, for example 0 and 10 volts. The voltage Vc applied to each pixel electrode 15 is varied so as to control the diffraction, and hence the grey level, produced by the pixel. When the voltage Vc is equal to one of the voltages Va and Vb, for example 0 volts, the pixel acts as a diffractive grating producing maximum diffraction. When the voltage Vc is substantially midway between the voltages Va and Vb, for example 5 volts, the grating is "erased" and the pixel produces minimum diffraction. Intermediate voltages give varying diffraction to produce the intermediate grey levels. The operation of a projection display using such a phase modulator is therefore substantially as described hereinbefore with reference to FIG. 6.

An advantage of the phase modulator in such an application is that it is capable of achieving grey levels. In particular, by varying the voltages on the electrodes 13 and 15 so as to vary the relative phase shift between light beams passing through adjacent regions such as 18a and 18b, the pixel acts as a diffraction grating of variable diffraction efficiency. Thus, in the case of a projection display system of the type shown in FIG. 6 where diffracted light for projection is collected, the amount of light diffracted away from the zeroth order can be varied by varying the signals supplied to the electrodes 15 with respect to the signals supplied to the electrode 13.

Other applications for phase modulators include beam steering, for instance as required for optical printing, and adaptive optics, for instance for focusing a source of light onto a plane whose distance varies as a function of time and/or position, for example in optical scanners.

Figure 11:
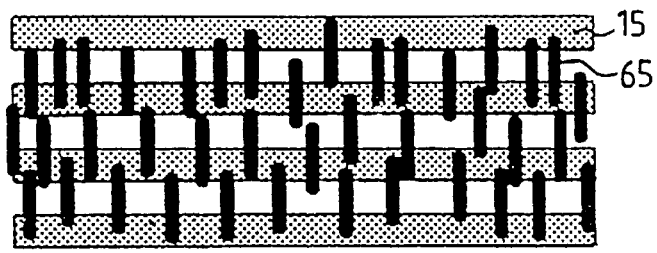
FIG. 11 is a diagram illustrating 90 degree planar alignment for a one dimensional diffraction application.
Figure 12:
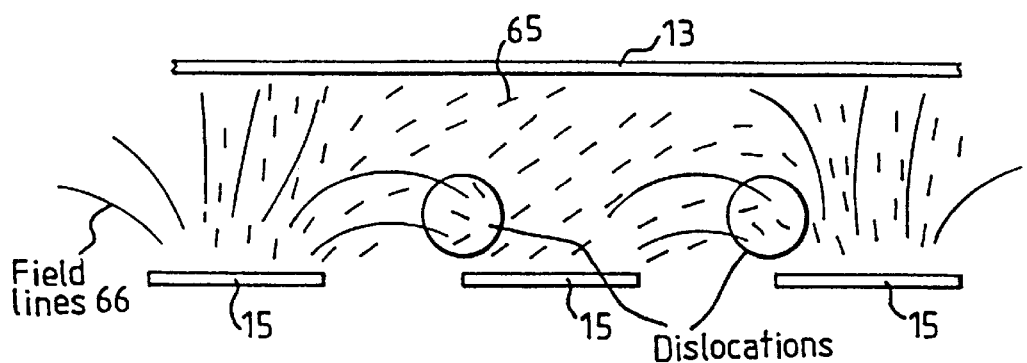
FIG. 12 is a diagram illustrating the formation of dislocations with the alignment illustrated in FIG. 11.

As shown in FIG. 11, where elongate electrodes are used as illustrated in FIGS. 7 to 10 in order to provide one dimensional diffraction of light, it is preferred from a polarisation conservation aspect to align the nematic liquid crystal at 90 degrees to the longitudinal axis of the electrodes. This is illustrated in FIG. 11 where the electrodes 15 are perpendicular to the long axes such as 65 of the nematic liquid crystal molecules. With this arrangement, in-plane fields which may occur between the electrodes do not force twisting of the molecules in the liquid crystal layer 8 and no second order polarisation mixing is induced. However, for this alignment, the nematic liquid crystal is forced at one edge of the electrodes to align contrary to the pretilt angle as illustrated in FIG. 12. In particular, where the electric field lines such as 66 between the electrodes 15 have opposite tilt to the substrate compared with the natural pretilt of the molecules as determined by the alignment layer, dislocations in the liquid crystal occur such as those shown ringed at 67. Such dislocations act as scattering defects and give rise to polarisation mixing and non-preservation of the polarisation states.

Figure 13:
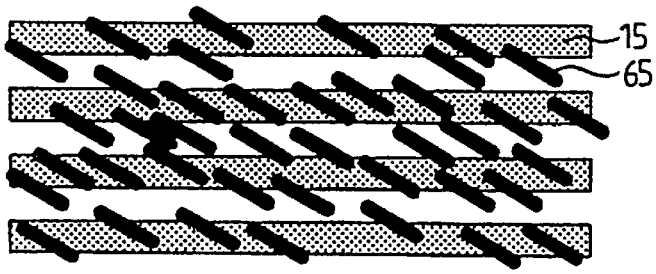
FIG. 13 illustrates planar angled alignment for a one dimensional diffraction application.

One technique for avoiding such dislocations is illustrated in FIG. 13. In this case, the alignment 65 of the molecules is at an angle between zero and 90 degrees with respect to the longitudinal axes of the electrodes 15.

Alternatively, a spacer layer may be disposed between the electrodes 15 and the nematic liquid crystal. This results in the field at the surface of the liquid crystal layer adjacent the electrodes 15 becoming lower in magnitude and more perpendicular to the surfaces of the liquid crystal layer so as to reduce the likelihood of dislocation formation.

Figure 14:
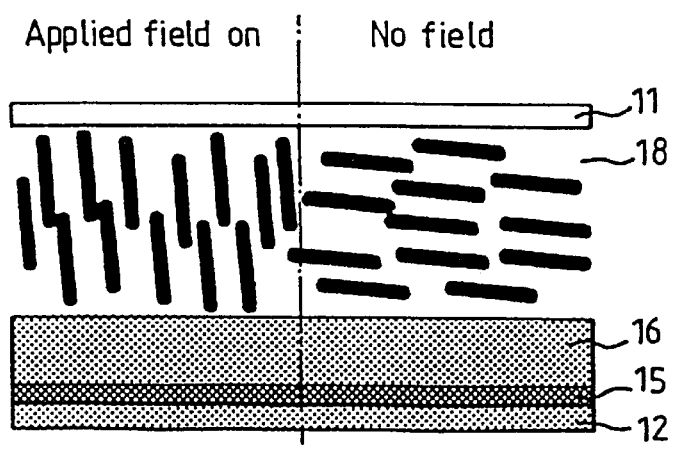
FIG. 14 is a sectional diagram illustrating antiparallel alignment.

FIG. 14 illustrates diagrammatically the Freedericksz alignment for a nematic liquid crystal of positive dielectric anisotropy with antiparallel alignment, as described hereinbefore. The right hand part of FIG. 14 illustrates the molecular alignment of the nematic liquid crystals in the absence of an applied field whereas the left hand side illustrates the molecular alignment for an applied electric field which is sufficient to rotate fully the molecules. However, other liquid crystal alignments may be used in devices of the type shown in FIGS. 7 to 10 as described hereinafter.

Figure 15:
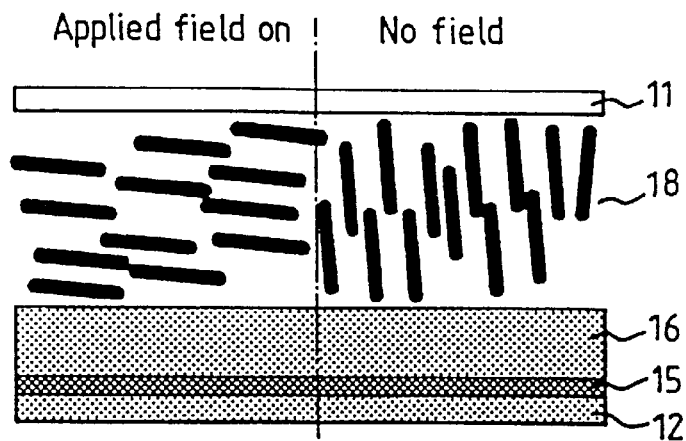
FIG. 15 is a sectional diagram illustrating homeotropic alignment.

FIG. 15 illustrates homeotropic alignment for a nematic liquid crystal material having negative dielectric anisotropy. In the absence of an applied field, the nematic liquid crystal molecules are aligned substantially normal to the surfaces of the cell with a slight tilt in a predetermined direction. By applying an alternating electric field to such a material, the molecules attempt to rotate such that their long axes are normal to the field as illustrated in the left hand part of FIG. 15. This results in a similar phase modulation as described hereinbefore but with opposite dependency on the applied field.

Figure 16:
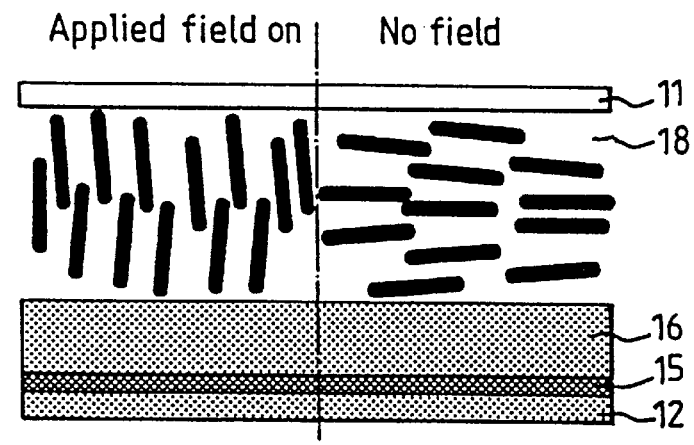
FIG. 16 is a sectional diagram illustrating π-cell alignment.

FIG. 16 illustrates a π-cell alignment in which a positive dielectric anisotropy nematic liquid crystal is used with parallel (as opposed to antiparallel) alignment, for instance by using alignment layers 14 and 17 which are rubbed in the same direction. This alignment causes the nematic liquid crystal to form two possible relaxed states. By maintaining at least some voltage across the cell, the V-state is favoured and can be made to switch in a similar way to the Freedericksz cell but with a faster response time.

Figure 17:
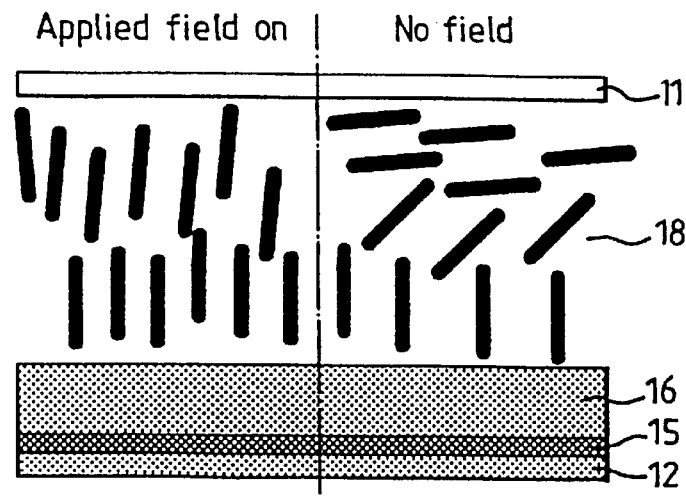
FIG. 17 is a sectional diagram illustrating hybrid nematic alignment.

FIG. 17 illustrates another example of out-of-plane nematic liquid crystal switching known as the hybrid aligned nematic or HAN structure, in which one surface is planar aligned and the other is homeotropically aligned as shown in the right hand part of FIG. 17. The resulting liquid crystal layer 18 has to be approximately twice as thick as for the arrangements shown in FIGS. 14 to 16 because of the out-of-plane switching present in part of the layer in the relaxed state. However, an advantage of this alignment is that no brushing or equivalent for planar alignment is required on one of the cell surfaces.

Figure 18:
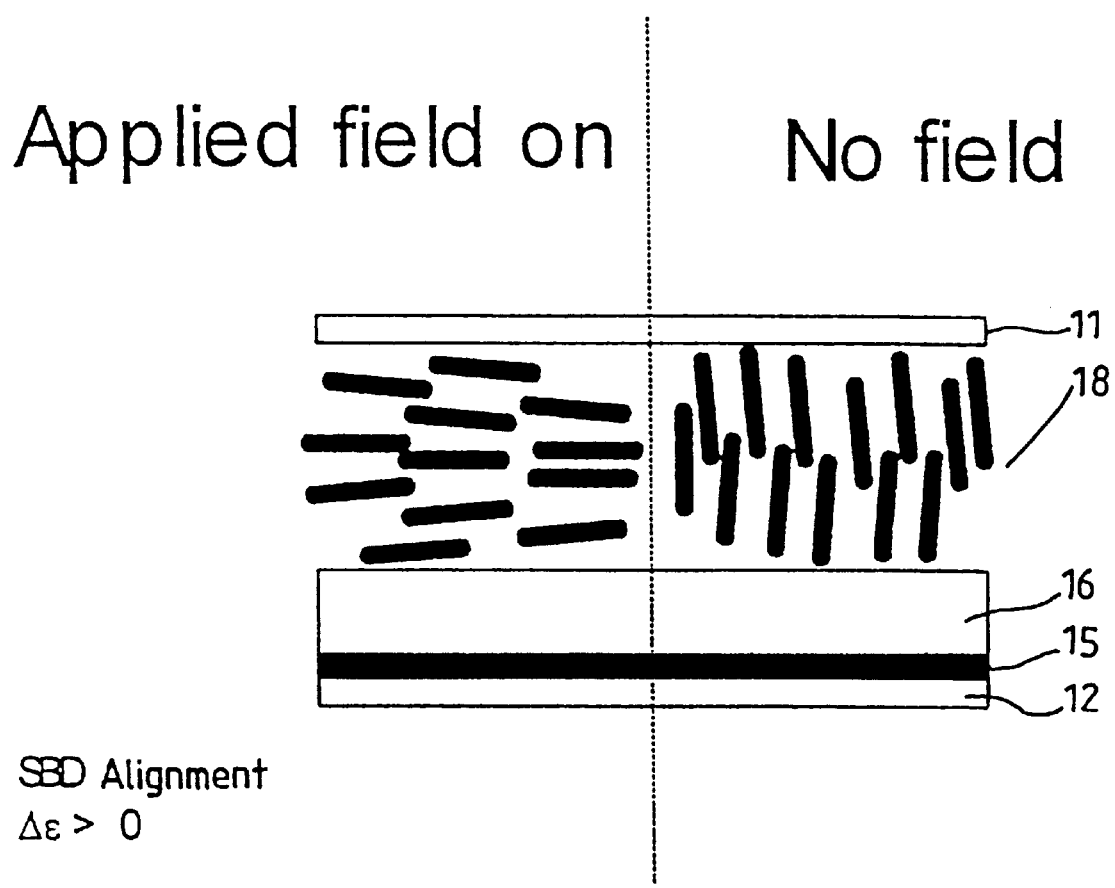
FIG. 18 is a sectional diagram illustrating splayed alignment.

FIG. 18 illustrates another example of out-of-plane nematic liquid crystal switching known as the splayed birefringent device (SBD) mode, which is described in WO97/12275. A nematic liquid crystal layer 18 is disposed between first and second mutually parallel alignment layers (not shown). The alignment layers inpart a high surface pre-tilt (preferably around 80–90°) to liquid crystal molecules in surface regions of the liquid crystal layer 18.

The nematic liquid crystal layer 18 has a negative dielectric anisotropy, so the liquid crystal molecules prefer to align themselves with their short axes parallel to an applied electric field. As a result of this and as a result of the mutually parallel alignment directions of the alignment layers, in the state of zero applied voltage the liquid crystal molecules in the layer 18 adopt a bend configuration across the thickness of the layer 18. When an electric field is applied, the liquid crystal molecules realign themselves to lie with their short axes along the direction of the applied field so as to produce a splay state. As the molecules re-orient themselves to lie with their short axes along the field direction, the birefringence of the liquid crystal layer 18 increases.

It is possible to use electrooptic materials other than liquid crystals for the layer 18. For instance, the electrooptic material may comprise lithium niobate.

Achromatic waveplate techniques may be used in the present devices. For instance, such techniques are disclosed in Pancharatnum et al, Proc. Ind. Acad. Sci, 1955, 41A, 130 and 137 "Achromatic Combinations of Birefringent Plates". The devices can be made to operate at different wavelengths by using a "static" achromatic waveplate 16 and by tuning the driving voltage and hence the field applied to the electrooptic material. For instance, for a colour projection display using phase modulators of the present type, three identical such modulators may be used for modulating red, green and blue light with the applied voltages to each devices being selected to optimise performance for the colour which it is required to modulate. Thus, only a single device needs to be manufactured so that costs may be reduced.

What is claimed is:

1. A polarisation independent optical phase modulator, comprising: first and second substrates; a reflector disposed between the first and second substrates; a waveplate, disposed between the first substrate and the reflector, for producing a retardation of $(n+1)\lambda/4$, where n is an integer greater than or equal to zero and $\lambda$ is a predetermined wavelength of visible light, and having an optic axis; and a polarisation dependent electrooptic layer, disposed between the waveplate and the first substrate, for modulating the phase of light having a polarisation substantially at 45 degrees to the optic axis of the waveplate;

the polarisation independent optical phase modulator having a plurality of picture elements, each of which has at least one transparent first electrode disposed between the first substrate and the electrooptic layer and a plurality of second electrodes disposed between the second substrate and the electrooptic layer, wherein each of the second electrodes are elongate and parallel.

2. A modulator as claimed in claim 1, in which n=0.

3. A modulator as claimed in claim 1, in which the waveplate comprises a layer of aligned and cured reactive mesogen.

4. A modulator as claimed in claim 1, in which the electrooptic layer comprises a layer of liquid crystal arranged to perform out-of-plane switching.

5. A modulator as claimed in claim 4, in which the liquid crystal is a nematic liquid crystal.

6. A modulator as claimed in claim 5, in which the liquid crystal has positive dielectric anisotropy and is disposed between alignment layers defining antiparallel alignment.

7. A modulator as claimed in claim 5, in which the liquid crystal has positive dielectric anisotropy and is disposed between alignment layers defining parallel alignment.

8. A modulator as claimed in claim 5, in which the liquid crystal has positive dielectric anisotropy and is disposed between alignment layers defining hybrid alignment.

9. A modulator as claimed in claim 5, in which the liquid crystal has negative dielectric anisotropy and is disposed between alignment layers defining homeotropic alignment.

10. A modulator as claimed in claim 5, in which the liquid crystal has negative dielectric anisotropy and is disposed between mutually parallel alignment layers.

11. A modulator as claimed in claim 1, in which the electrooptic layer comprises a layer of lithium niobate.

12. A modulator as claimed in claim 1, in which the second electrodes comprise the reflector.

13. A modulator as claimed in claim 1, in which the first electrodes of all of the picture elements comprise a continuous layer of conductor.

14. A modulator as claimed in claim 1, in which the second substrate carries an active addressing matrix connected to the second electrodes.

15. A modulator as claimed in claim 12, in which the second substrate carries an active addressing matrix connected to the second electrodes.

16. A modulator as claimed in claim 13, in which the second substrate carries an active addressing matrix connected to the second electrodes.

17. A modulator as claimed in claim 1, further comprising means for applying voltages to the second electrodes to cause each picture element to act as a phase-only diffraction grating for effecting diffractive modulation.

18. A modulator as claimed in claim 1, wherein the second electrodes are interdigitated to receive different voltage.

19. A modulation as claimed in claim 1, wherein the electrooptic layer comprises liquid crystal matenial in a non-twisted mode.

* * * * *